United States Patent Office 3,513,864
Patented May 26, 1970

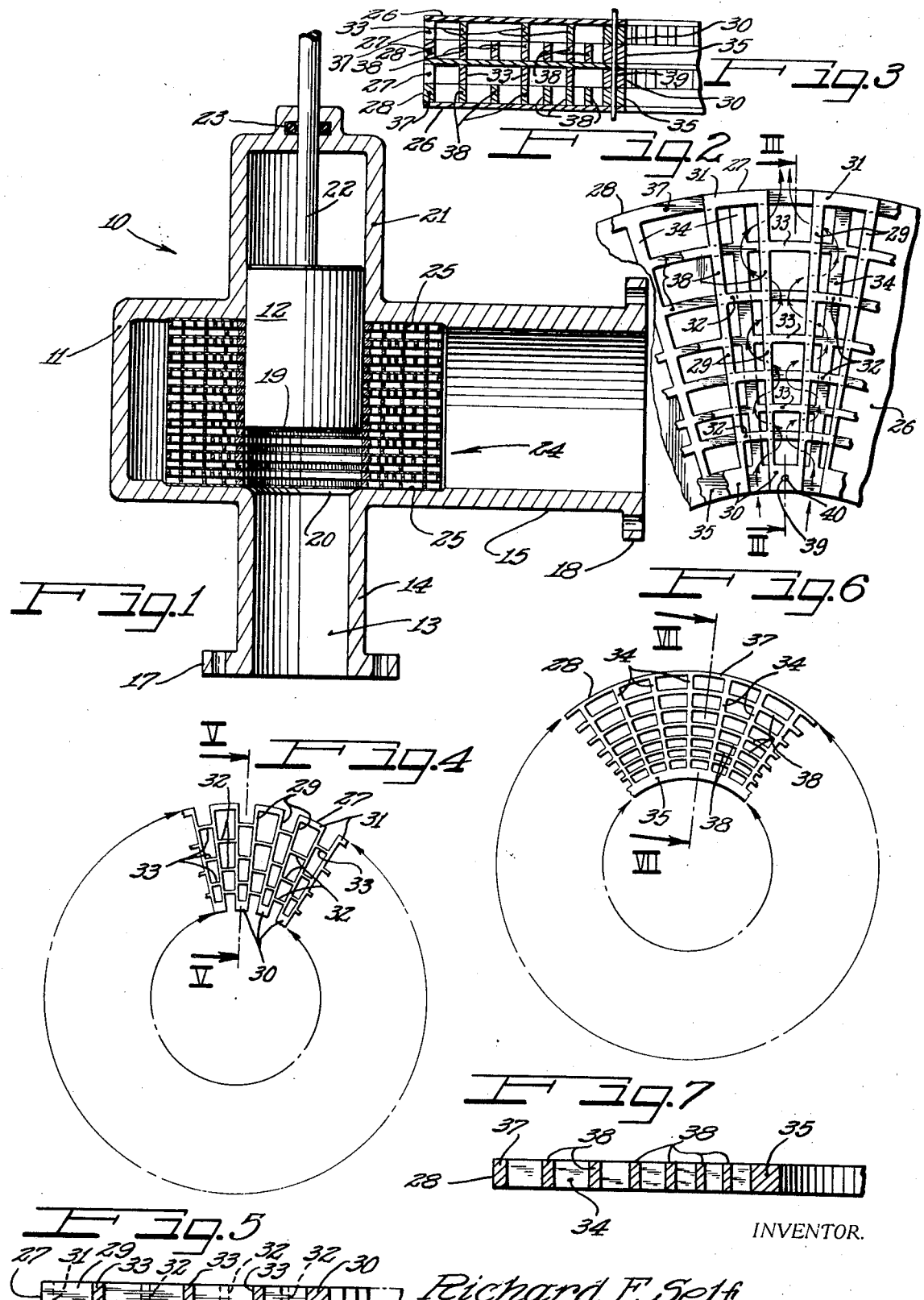

3,513,864
HIGH PRESSURE FLUID CONTROL MEANS
Richard E. Self, 3221 Brimhall Drive,
Los Alamitos, Calif. 90720
Filed Nov. 22, 1968, Ser. No. 778,281
Int. Cl. F16k *11/07, 47/00*
U.S. Cl. 137—14       14 Claims

ABSTRACT OF THE DISCLOSURE

Energy of a flowing high pressure fluid is dissipated by subdivision in a skeletal disk baffle grid assembly into a plurality of tortuous courses in which there are repeated changes of direction in different planes.

---

The present invention relates to velocity control of high pressure flowing fluids, equally efficient in respect to liquids and gasses, and is more particularly concerned with effecting high energy loss or dissipation of energy to avoid the damaging effects heretofore commonly experienced as a result of substantial pressure drop in the system.

In the handling of flowing high pressure fluids, it has been customary to utilize orifice means having a high velocity short throat section, or valve means, to attain energy losses or high pressure drop. If the fluid is in a liquid state and liable to flash, that is, vaporize or turn to gaseous condition on the downstream side of the orifice or valve opening, it may condense implosively and induce damaging shock waves, cause erosion, and the like. For example, hot water or other liquid, may flash or cavitate to steam or gas as it passes at high velocity through the throat of the orifice or valve opening and may then recondense downstream with implosive action, resulting in energy losses but inducing high energy shock waves that may severely damage and erode the downstream section of a pipe or valve.

Having special regard to control valve operation, life and application, is the high velocity attained by the flowing medium as it passes through the valve. As the velocity of the fluid in the valve exceeds the velocity of the fluid in the line, several disturbing reactions occur. The most serious and immediate problem is rapid erosion of the valve seat plug by direct impingement of the liquid or droplets and suspended foreign particles in either a gas or liquid. Additional erosion results from cavitation—high speed implosion of vapor against the trim and body. In addition to the severe problems resulting from erosion, the increased velocity also causes the flow characteristics of the valve to become unpredictable and erratic. This occurs because the changes in velocity significantly affect the valve vena contracta vortexes and fluid enthalpies. Other objectionable problems created by the high fluid velocity in the valve are severe noise generation, trim fatigue and possible degradation of flowing fluid materials such, for example, as polymers.

These problems associated with high internal valve velocity have been widely recognized throughout the valve industry for many years. Attempted solutions have been to use much harder alloys, and more recently velocity containment. While these have helped somewhat, they have not eliminated the basic problem, namely, high velocity.

According to principles of the present invention the foregoing and other deficiencies and disadvantages are overcome by effecting dissipation of energy of a flowing high pressure fluid by subdividing it into a plurality of passageways in which there are rapid changes of direction in different planes, as by means of a skeletal disk baffle grid assembly providing tortuous courses for the fluid.

An important object of the present invention is to effect energy losses in high pressure flowing fluid without increasing velocity and shock wave reaction, thus avoiding damage and erosion in the equipment.

Another object of the invention is to control and limit fluid velocity to substantially that within the associated line or piping while effecting energy losses.

A further object of the invention is to provide novel method and means for dividing and controlling a high pressure fluid into a plurality of smaller streams and directing the fluid in multi-angular, tortuous, energy absorbing changes of direction.

Still another object of the invention is to provide new and improved means for controlling both velocity and pressure of a flowing fluid in a manner to eliminate problems of erosion, control, noise and fatigue ordinarily caused by high velocity.

A yet further object of the invention is to provide high energy loss fluid control means having a wide range of versatility and usefulness.

Other objects, features and advantages of the present invention will be readily apparent from the following detailed description of a preferred embodiment thereof taken in conjunction with the accompanying drawings, in which:

FIG. 1 is a longitudinal sectional detail view through a high energy fluid loss control device embodying features of the invention, in the form of a valve;

FIG. 2 is a fragmentary enlarged plan view of one representative section of a skeletal disk baffle grid assembly according to the invention;

FIG. 3 is a reduced scale sectional detail view taken substantially along the line III—III of FIG. 2;

FIG. 4 is a plan view of one of the skeletal disks used in the baffle grid assembly;

FIG. 5 is an enlarged sectional detail view taken substantially along the line V—V of FIG. 4;

FIG. 6 is a plan view of another of the skeletal disks used in the baffle grid assembly; and FIG. 7 is an enlarged fragmentary sectional detail view taken substantially along the line VII—VII of FIG. 6.

In one useful application of the present invention it may be embodied in a control valve assembly 10 (FIG. 1) which includes a valve housing 11 within which a valve plug 12 is mounted in controlling relation to a passage 13 which extends through angularly related hollow portions 14 and 15 having respective flanges 17 and 18 at their open ends by which the housing is adapted to be secured in fluid-tight communication with other members serving as continuations of the passage 13 in a flow system wherein high pressure fluid may enter the housing through the portion 14 and discharge through the portion 15 at lower velocity and/or pressure. For controlling the passage 13, the valve plug 12 is reciprocably mounted coaxially with the housing passage section 14 to be moved between a closing position wherein a valve shoulder 19 on the plug engages a valve seat 20 about the inner end of the section of the passage 13 within the housing portion 14 and an open position, with the plug guided in a hollow guiding head extension 21 extending coaxially from the opposite side of the housing relative to the passage portion 14. Reciprocal movements of the valve plug 12 are adapted to be effected by means of a valve stem 22 extending outwardly through a pocking gland 23 in the head end of the chamber portion 21.

Energy losses in high pressure flowing medium in the passage 13 without damaging velocities and abrupt pressure drop is effected by subdividing the medium into a plurality of individual streams of respective relatively small volume and conducting them through respective passageways, providing tortuous courses, in which there are rapid changes of direction in different planes to impose frictional resistance energy loss and reduce the volocity to substantially that at which the fluid is intended to leave the valve housing. For this purpose, an energy loss passageway body 24 is mounted across the passage 13 in such a manner as to compel flow therethrough of the fluid medium. Although the body 24 may be simply a partition of suitable thickness across the inner end of that portion of the passageway in the housing portion 15 or elsewhere located along such portion of the passage, or even in the portion of the passage within the tubular housing portion 14, depending upon the use to which the device is to be put, in the illustrated control valve assembly, the body 24 is constructed and arranged to have the energy-dissipating passageways therethrough controlled by the valve member 12. For this purpose, the body 24 has an inner face which is located to be slidably engaged by the valve member. In one desirable construction, as illustrated, where the valve member 12 is a cylindrical plug, the body 24 is of annular shape and of a length to engage on respective opposite seats 25 provided therefore in the housing about the valve seat 20 and about the inner end of the valve guiding surface provided by the housing head 21 and with an internal cylindrical face of the body a concentric continuation of the guiding surface. It will be appreciated, of course, that although the housing 11 has been depicted in FIG. 1 schematically as a one-piece structure, as has also the valve plug 28, any preferred multi-part construction may be utilized in either the housing or the valve plug or both. While the body 24 may be assembled with the housing as part of a casting or molding, the housing may be suitably separable to insert or remove the body 24, as desired.

As alluded to hereinbefore, a basic problem in controlling valve operation, life and application is the high velocity attained by the flowing media as it passes through the valve. The velocity phenomenon can be simply stated as $V=\sqrt{2gh}$ wherein V is velocity, $g$ is the gravitational constant, and $h$ is the variable static pressure head across the valve seat. In all valves, V is a direct function of the pressure across the valve seat, and V increases correspondingly with increasing pressure drop.

By dividing the flow stream into a plurality of small flow streams in the individual configurated passageways containing turns and/or restrictions, each turn and restriction reduces the pressure by one velocity head per turn, with the resultant effect of altering the basic velocity equation to $V=\sqrt{2gh}/N$ with N representing the number of turns in the series in the individual fluid passageways. This concept and technique enables control of both velocity and pressure to any degree desired.

For additional advantageous utilization of the principles of the invention in the development of resistance to flow, efficient accommodation to expansion of gasses in the controlling passageways, ease of cleaning, compactness, ability to pressure-balance the valve poppet or plug and the ability to easily incorporate the most efficient valve sealing techniques, a generally labyrinth arrangement of flow control energy loss passageways in the body 24 is provided by constructing the body as a stack of annular disks which are cooperatively constructed and arranged to provide the passageways.

In a desirable form, skeletal baffle grid disks 27 are paired with complementary skeletal baffle grid disks 28, and each pair of disks is separated from each other pair of disks by a substantially imperforate end closure disk 26. All of the disks may be economically made as stampings from suitable material, although other types of manufacture such as casting, molding, and the like may be employed.

In the illustrated instance, the disks 27 and 28 are provided with respective patterns of holes therethrough such that when the disks are laminated and properly circumferentially oriented to place the holes in partially overlapping relation respective passageways are provided extending from edge-to-edge of the assembly and defining tortuous courses for the fluid flowing therethrough. To this end, each of the disks 27 has a grid pattern comprising a sinuous arrangement of elongated radial baffle bars 29 having their inner ends connected by alternate pairs by circumferential baffle bars 30 and their outer ends connected in staggered alternate pairs by circumferential baffle bars 31. Thereby alternate generally hairpin baffle bar sections are provided wherein the sections having the outer peripheral connecting bars 31 open inwardly and the sections having the inner peripheral connecting bars 30 open outwardly from the respective perimeters. Each of the inwardly opening hairpin sections has a plurality, herein three, circumferentially transverse and radially spaced divider baffle bars 32 connecting the elongated bars 29 thereof. The innermost of the bars 32 is spaced from the mouth end of the section, and the respective bars 32 provide between themselves and with the bars 29 and 31 successive holes, in this instance quadrangular, within which the bars present baffle surfaces. In similar, but staggered relation to the bars 32, transverse divider baffle bars 33 extend between and integral with the elongated bars 29 defining the radially outwardly opening hairpin-like sections. The radially outermost of the bars 33 is spaced inwardly from the mouth or opening of its section, and the bars 33 are spaced one from the other and from the inner enclosing bars 30 to provide open areas or holes within which the bars present baffle surfaces.

Each of the disks 28 is formed on a regular grid pattern in which equally circumferentially spaced elongated radial baffle bars 34 are connected at their inner ends to a continuous annular inner peripheral bar 35 and at their outer ends to a continuous annular outer peripheral bar 37, providing radial segments. Each of the radial segments is subdivided between the bars 35 and 37 by circumferentially extending radially spaced respective sets of circumferentially extending divider bars 38 which are in each successive radail interval aligned circumferentially with the similar bars of the other segments so that in one sense they may be considered continuous annular progressively radially spaced grid bars.

In the laminar operative assembly of each pair of the skeletal disks 27 and 28, the respective grids thereof are so constructed and related to one another that each of the radial bars 34 of the disk 37 is aligned medially radially along one of the inwardly opening sections of the disk 27 and the radially extending bars 32 of the disk 27 extend radially between and in spaced relation to the bars 34 such that the outwardly opening sections of the disk 27 open radially outwardly medially relative to the associated segment of the disk 28. Further, there are twice the number of divider bars 38 in each of the segments of the disk 27 as there are trænsverse divider bars 32 and 33 in the sections of the disk 27, with the radial spacing of the respective divider bars of the disks related to be in contiguous alignment with the corresponding bars of the other disk in each instance to provide respective alternate blockages radially compelling fluid flowing, for example, from the inner perimeter of the assembly, as shown by directional arrows in FIG. 2, to move in a tortuous course first into the opening provided by the inwardly opening hairpin section of the disk 27, and then laterally into one of the adjacent open areas of the disk 28, thence over the innermost of the divider bars 38 into the innermost of the open areas of the outwardly opening hairpin section of the disk 27, into the next outwardly adjacent opening related to the segment of the disk 28. Thence the fluid must pass into the innermost bar-enclosed area of the entry hairpin section, and then continue such tortuous course repeatedly, until the fluid exits from an opening from one of the radially outwardly opening hairpin sections of the disk 27. As the fluid travels the over-and-under, back-and-forth, multi-plane serpentine circumferential and axial turns with changes of direction, in the tortuous courses in the passageways provided by the grid disks between the respective end closures for each pair of grid disks, highly effective energy loss or dissipation is attained. Further, a progressive increase in cross sectional flow area of the passageways afforded by the progressive widening and lengthening of the grid opening areas from the inner to the outer perimeter of the assembly, has a progressive velocity damping effect.

In order to assure assembly of all of the several disks in the stack in proper relative orientation, they may be provided with indexing mean comprising aligned holes 39 at one or more places in the rim areas thereof and preferably at the inner perimeter rim portions where the bars of the grid disks may be somewhat wider than at the outer perimeter, with one or more index pins 40 extending through the aligned holes.

It will be apparent, of course, that the diameter, thickness, number, actual configuration of grid pattern, and the like, may be varied considerably within the principles of the invention to meet various operative requirements.

In operation of the device, the relationship is desirably such that the controlling, tortuous, subdividing, energy dissipating passageways cause the velocity at the exit ends of the passageways to be approximately the velocity anticipated downstream from the control passageway body. As a result, the greatest amount of energy or pressure head is dissipated, cavitation eliminated, erosion of seat or trim in a valve structure eliminated, noise associated with cavitation or high velocity eliminated, vena contracta effects on valve control predictability eliminated, the destructive separation damage to molecular chains or polymers as a result of high valve velocity eliminated, and the like.

In the valve 10, efficient volume of flow control is attained from complete stoppage to full volume by adjustment of the valve plug 12 axially within the axial, central chamber in the control body.

In addition to use of the invention in control valve applications, many other uses for the highly efficient high energy loss fluid control will readily be apparent or present themselves. Examples are, high presure mufflers, relief valves, vent valves, feed pump recirculation, desuperheater spray, turbine bypass, steam pressure reducers, gas regulators, feedwater bypass, hotwell control, circulating pump seal, reheat spray, drum or steam blowdown, steam back pressure control, pump loading, level control, temperature control, pressure control, turbine load, superheater bypass, flash tank drain, let-down for ammonia or various polymers such as polyethelene, urea and the like.

It will be understood that variations and modifications may be effected without departing from the spirit and scope of the novel concepts of this invention.

I claim as my invention:

1. A high energy loss flow controlling device comprising:
    means having a plurality of passageways through which flow of high pressure fluid is subdivided;
    said passageways providing therealong repeated fluid velocity reducing changes of direction in different planes.

2. A device according to claim 1, said passageways presenting tortuous courses in which the fluid travels in a generally serpentine manner.

3. A device according to claim 1, said passageways having direction changing baffle surfaces along their length.

4. A device according to claim 1, comprising laminar disks having respective patterns of holes therethrough, said holes being in offset but partially overlapping relation to one another to provide said passageways.

5. A device according to claim 1, said means comprising annular passageway disks in laminated relation, each of the disks having therein a complementary part of each passageway, and openings to the passageways through inner and outer peripheries of the disk laminate.

6. A device according to claim 1, said means comprising disks in laminar relation and having complementary portions of the passageways therein.

7. A device according to claim 6, said passageways increasing progressively in cross sectional flow area between opposite ends thereof.

8. A device according to claim 6, said disks being of skeletal form and providing respective baffle grids.

9. A device according to claim 6, said disks being related by laminar pairs and having substantially imperforate surface means in passageway enclosing relation to the opposite faces of each laminar pair.

10. A device according to claim 7, one of the disks of each pair having a grid bar pattern of alternate hairpin-like sections in which alternate sections open through one edge of the disk and the remaining sections open through an opposite edge of the disk, the sections having elongated bars and transverse bars connected therebetween across the sections spaced from the open ends thereof, and the other of the disks of each pair having a grid bar pattern comprising elongated and divider bars with the elongated bars offset relative to the elongated bars of said sections, said connecting and transverse bars of the disks cooperating with one another and with said elongated bars to define said passageways.

11. A method of high energy loss flow control comprising:
    subdividing high pressure fluid into a plurality of streams;
    and repeatedly changing the direction of said streams in different planes, and imparting high frictional resistance losses to diminish the velocity and pressure of the streams.

12. A method according to claim 11, comprising directing said turns in serpentine tortuous courses.

13. A method according to claim 11, including progressively expanding said streams from an entry to a discharge.

14. A method according to claim 11, comprising baffling the streams at said turns.

References Cited

UNITED STATES PATENTS

| | | | |
|---|---|---|---|
| 973,328 | 10/1910 | Willman | 137—625.28 XR |
| 1,234,251 | 7/1917 | Zorzytzki | 251—127 XR |
| 1,964,300 | 6/1934 | Perry et al. | 138—43 |
| 2,021,079 | 11/1935 | Mittendorf et al. | 138—42 |
| 2,722,942 | 11/1955 | Hencken | 251—118 XR |

HENRY T. KLINKSIEK, Primary Examiner

U.S. Cl. X.R.

137—28, 625; 138—42; 251—205, 127